United States Patent
Yamamoto

(10) Patent No.: US 11,899,993 B2
(45) Date of Patent: Feb. 13, 2024

(54) COMMUNICATION DEVICE AND NON-TRANSITORY COMPUTER-READABLE MEDIUM STORING COMPUTER READABLE INSTRUCTION FOR COMMUNICATION DEVICE THAT OPERATE IN PARALLEL IN A FIRST MODE AND A SECOND MODE

(71) Applicant: BROTHER KOGYO KABUSHIKI KAISHA, Nagoya (JP)

(72) Inventor: Ryo Yamamoto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/159,210

(22) Filed: Jan. 25, 2023

(65) Prior Publication Data
US 2023/0244423 A1 Aug. 3, 2023

(30) Foreign Application Priority Data
Jan. 31, 2022 (JP) ................. 2022-012827

(51) Int. Cl.
*G06F 3/12* (2006.01)

(52) U.S. Cl.
CPC ............ *G06F 3/1215* (2013.01); *G06F 3/124* (2013.01); *G06F 3/1231* (2013.01); *G06F 3/1236* (2013.01); *G06F 3/1287* (2013.01); *G06F 3/1288* (2013.01)

(58) Field of Classification Search
CPC .... G06F 3/1215; G06F 3/1231; G06F 3/1236; G06F 3/124; G06F 3/1287; G06F 3/1288
See application file for complete search history.

(56) References Cited

U.S. PATENT DOCUMENTS

2012/0229844 A1  9/2012  Yada et al.
2022/0100447 A1* 3/2022  Uno ................. G06F 3/1288

FOREIGN PATENT DOCUMENTS

JP  2012-187866 A  10/2012

OTHER PUBLICATIONS

English Machine Translation of JP 2004-185521-A (Ogawa, Published Jul. 2, 2004) (Year: 2004).*
English Machine Translation of JP 2021-057890-A (Saito, Published Apr. 8, 2021) (Year: 2021).*

* cited by examiner

*Primary Examiner* — Juan M Guillermety
(74) *Attorney, Agent, or Firm* — MERCHANT & GOULD P.C.

(57) ABSTRACT

A communication device may include a controller. The controller may be configured to, in a case where a process executing instruction is sent to a notification server from a terminal device, receive a process executing notification from the notification server, and in a case where the process executing notification is received from the notification server, execute a predetermined process. The process executing notification may be received by operating in parallel in a first mode and a second mode. In the first mode, the process executing notification may be received by sending a polling signal to the notification server. In the second mode, the process executing notification may be received by establishing a connection of server-push type between the communication device and the notification server.

17 Claims, 13 Drawing Sheets

(Case D: Printer 10 Belongs to LAN 62)

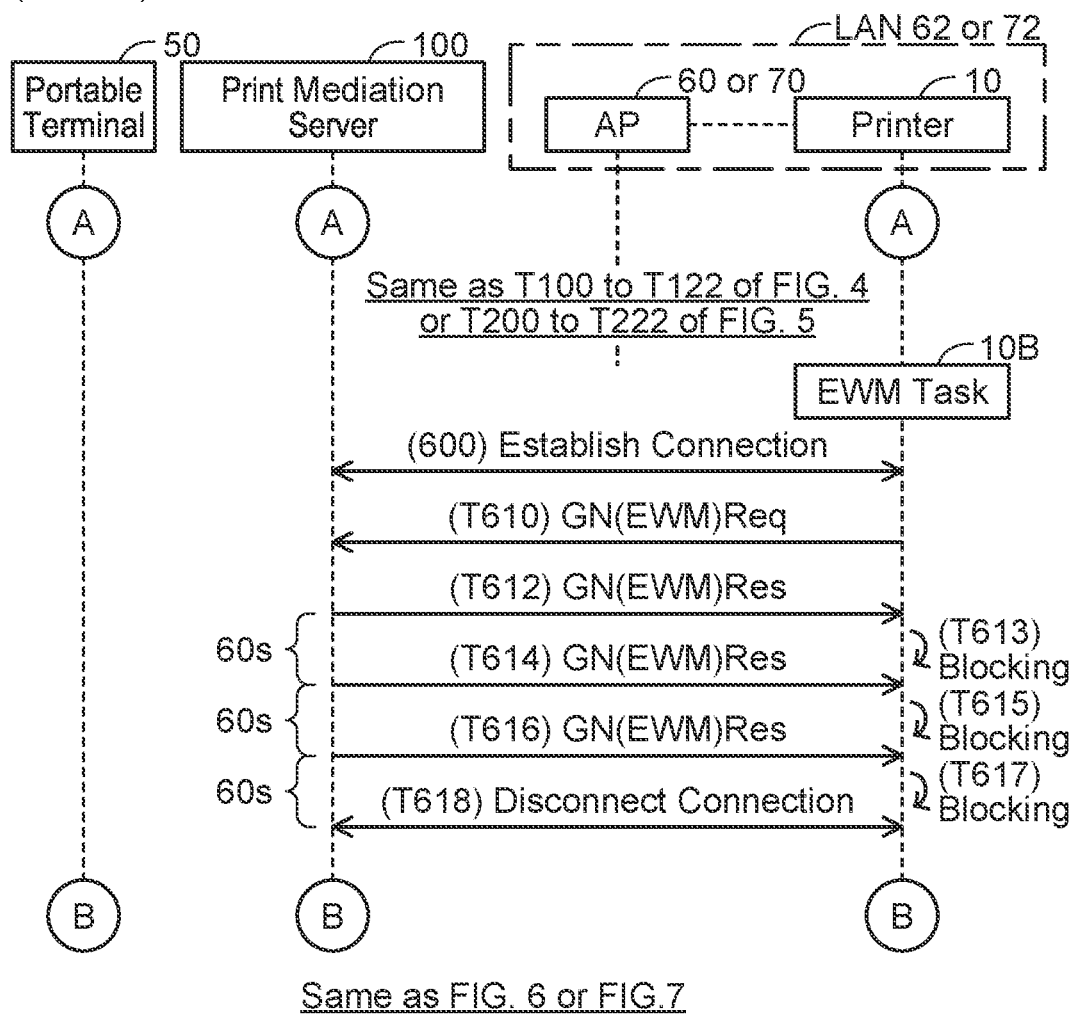

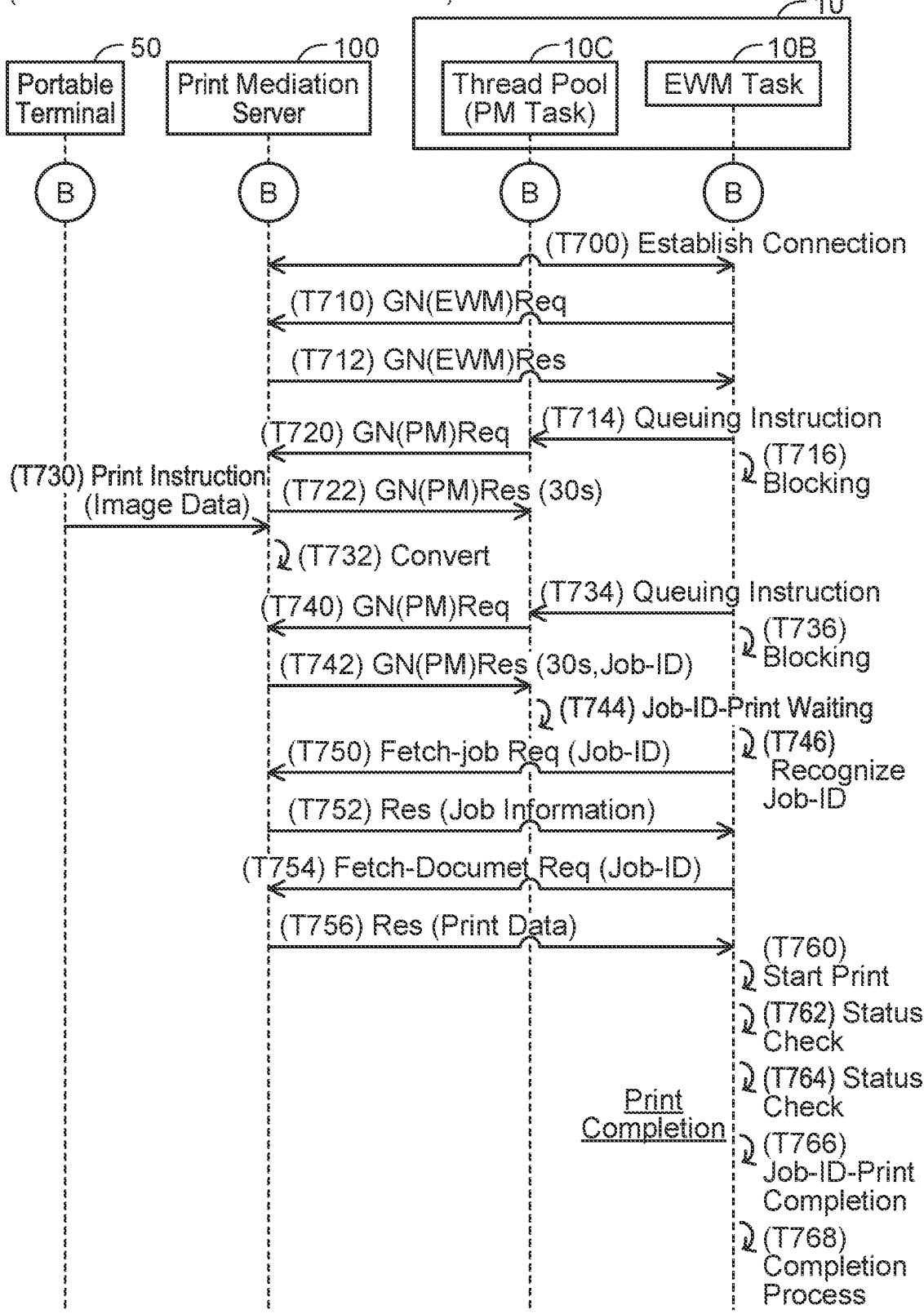

COMMUNICATION DEVICE AND NON-TRANSITORY COMPUTER-READABLE MEDIUM STORING COMPUTER READABLE INSTRUCTION FOR COMMUNICATION DEVICE THAT OPERATE IN PARALLEL IN A FIRST MODE AND A SECOND MODE

REFERENCE TO RELATED APPLICATIONS

This application claims priority from Japanese Patent Application No. 2022-012827 filed on Jan. 31, 2022. The entire content of the priority application is incorporated herein by reference.

BACKGROUND ART

A printer which can print in accordance with Google Cloud Print (GCP) is known. When the printer has established an eXtensible Messaging and Presence Protocol (XMPP) connection with a print mediation server (hereafter referred to as "XMPP mode"), the printer receives a notification related to printing from the print mediation server without periodically sending a polling signal to the print mediation server when a print job is generated by the print mediation server. When the connection with the pint mediation server becomes unstable while the printer is operating in the XMPP mode, the printer closes the XMPP stream and shifts to a state in which it periodically sends the polling signal to the print mediation server (hereafter referred to as "polling mode"). The printer receives a notification related to printing from the print mediation server when the print mediation server has a print job when the polling signal is sent.

DESCRIPTION

In the polling mode, after a print job is generated in the print mediation server, the aforementioned notification is not sent from the print mediation server to the printer until a polling signal is sent from the printer to the print mediation server. Due to this, it requires long time for printing to start after the print job is generated. On the other hand, in the XMPP mode, an event in which the printer cannot suitably receive the notification from the print mediation server may occur.

The present disclosure provides a technique which enables a communication device to promptly and suitably receive a process executing notification from a notification server.

A communication device disclosed herein may comprise a controller. The controller may be configured to: in a case where a process executing instruction is sent to a notification server from a terminal device, receive a process executing notification from the notification server; and in a case where the process executing notification is received from the notification server, execute a predetermined process. The process executing notification may be received by: operating in parallel in a first mode and a second mode; sending a polling signal to the notification server in the first mode; in a case where the polling signal is sent to the notification server after the process executing instruction has been sent to the notification server from the terminal device, receiving the process executing notification which is a response of the polling signal from the notification server; establishing a connection of server-push type between the communication device and the notification server in the second mode; and in a case where the process executing instruction is sent to the notification server from the terminal device in a state where the connection is established, receiving the process executing notification from the notification server by using the connection.

According to the above configuration, the communication device operates in parallel in the first mode and the second mode and receives the process executing notification from the notification server. Due to this, the communication device may suitably receive the process executing notification from the notification server in the first mode even if the communication device cannot receive the process executing notification from the notification server in the second mode. As compared to the configuration in which the communication device operates only in the first mode, the communication device may promptly receive the process executing notification from the notification server in the second mode. Accordingly, the communication device may promptly and suitably receive the process executing notification from the notification server.

A computer program for implementing the communication device above, a non-transitory computer-readable recording medium storing the computer program and a method implemented by the communication device are also novel and useful. A system comprising the communication device and one or more different devices (e.g., the notification server and/or the terminal device) is also novel and useful.

FIG. 12 illustrates a sequence diagram of Case E.

FIG. 13 illustrates a sequence diagram of Case F of a fourth embodiment.

Figure 1:
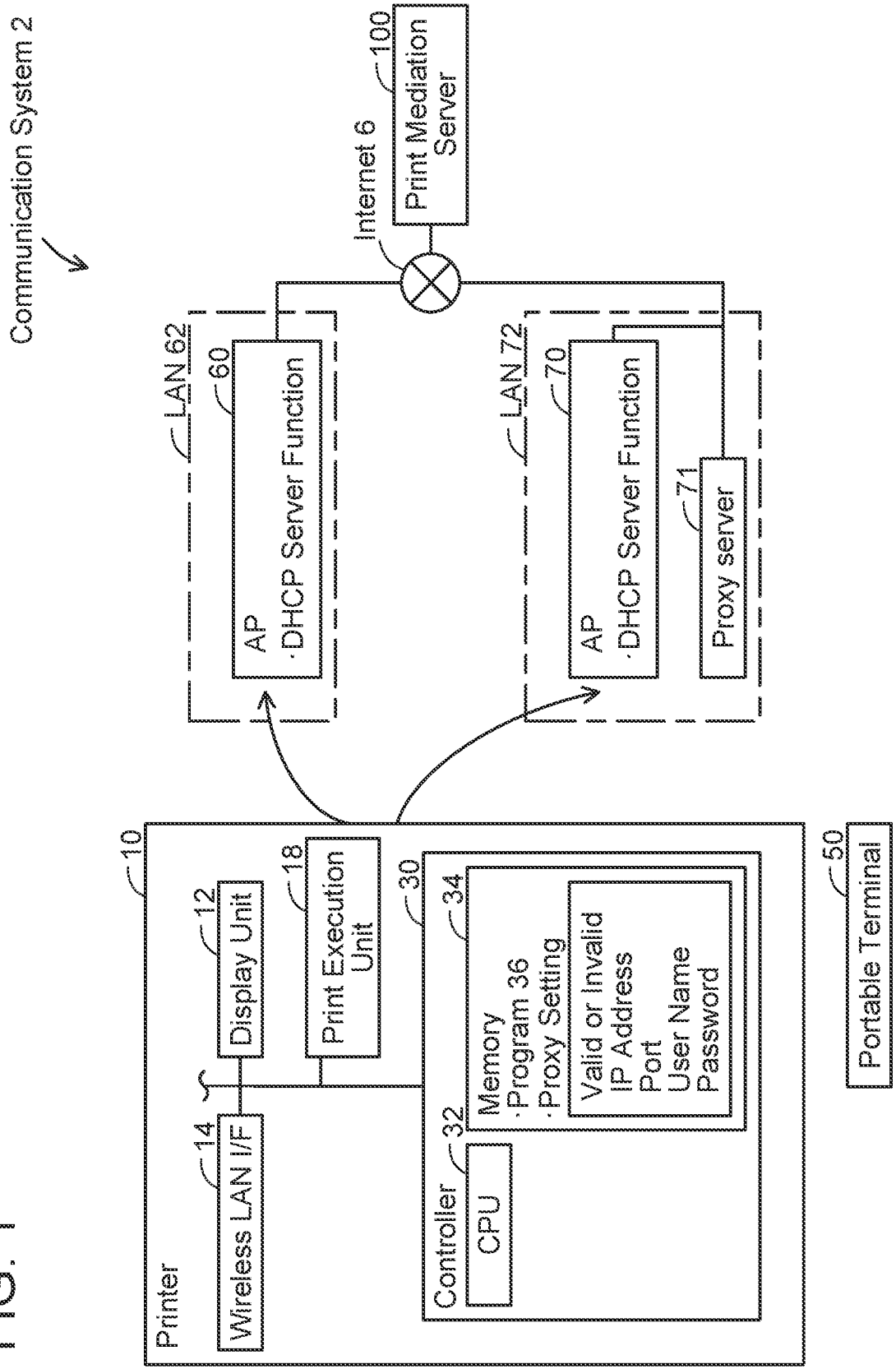
FIG. 1 illustrates a configuration of a communication system.

FIRST EMBODIMENT (Configuration of Communication System 2; FIG. 1)

As illustrated in FIG. 1, a communication system 2 includes a printer 10, a portable terminal 50, a plurality of access points (hereafter referred to as "AP" (Access Point)) 60, 70 and a print mediation server 100. The printer 10 can selectively belong to a Local Area Network (LAN) 62 in which the AP 60 operates as a parent station or a LAN 72 in which the AP 70 operates as the parent station. The print mediation server 100 is connected to the Internet 6. When the printer 10 belongs to the LAN 62 or the LAN 72, the printer 10 can communicate with the print mediation server 100 via a corresponding one of the AP 60 and the AP70. In a modification, the LAN 62 and the LAN 72 may be wired LANs instead of wireless LANs. When the portable terminal 50 belong to the LAN 62 or the LAN 72, the portable terminal 50 can communicate with the printer 10 and the print mediation server 100 via the corresponding one of the AP 60 and the AP 70. In a modification, the portable terminal 50 may communicate with the print mediation server 100 via cellular communication such as 3G, 4G, or 5G.

(Configuration of Printer 10)

The printer 10 is a peripheral device configured to execute a print function (e.g., a peripheral device of the portable terminal 50). The printer 10 includes a display unit 12, a wireless LAN interface 14, a print execution unit 18 and a controller 30. The units 12 to 30 are connected to bus lines (reference sign omitted).

The display unit 12 is a display for displaying various types of information. The display unit 12 also functions as a so-called touch screen (i.e., an operation unit operated by a user). The wireless LAN interface 14 is a wireless interface for wireless communicating in accordance with the Wi-Fi standards. Specifically, the wireless LAN interface 14 establishes a wireless connection with the AP 60 or with the AP 70. Consequently, the printer 10 belongs to the LAN 62 or the LAN 72. The print execution unit 18 is a printing mechanism of an inkjet scheme, a laser scheme, or the like.

The controller 30 includes a CPU 32 and a memory 34. The CPU 32 executes various processes in accordance with the program 36 stored in the memory 34. The memory 34 is configured of a volatile memory, a nonvolatile memory, and the like. The memory 34 stores proxy setting as well as the above program 36.

The proxy setting includes flag information indicating one of "valid" indicating that a proxy server 71 is to be used and "invalid" indicting that the proxy server 71 is not used. The proxy setting may further include a plurality of setting values for using the proxy server 71. The plurality of setting values includes an IP address of the proxy server 71, a port number used in communication with the proxy server 71, a user name and a password. The flag information and each setting value are stored in the memory 34 in response to they being inputted to the printer 10 by a user.

(Configurations of APs 60, 70)

Each of the APs 60, 70 includes a Dynamic Host Configuration Protocol (DHCP) server function. Thus, each of the APs 60, 70 can assign an IP address to a device which belongs to a corresponding one of the LAN 62 and the LAN 72. The proxy server 71 is further provided in the LAN 72 formed by the AP 70.

(Configuration of Portable Terminal 50)

The portable terminal 50 is a mobile terminal device such as a cellphone, a smartphone, a PDA or a tablet PC. In a modification, a desktop PC or a notebook PC may be used instead of the portable terminal 50. Hereafter, the portable terminal 50 will be referred to as "terminal 50".

(Configuration of Print Mediation Server 100)

The print mediation server 100 is a server which provides a cloud print service such as the Google (registered trademark) Cloud Print (GCP) service. In the cloud print service, when the print mediation server 100 receives a print instruction including image data from a terminal device (e.g., 50), the print mediation server 100 sends a notification to a printer (e.g., 10). Then, the print mediation server 100 converts the image data to generate print data and sends the print data to the printer. The print mediation server 100 is not a server provided by a vendor of the printer 10 but a server provided by a business entity which provides the cloud print service. In a modification, the print mediation server 100 may be a service provided by the vendor of the printer 10. Hereafter, the print mediation server 100 will be referred to as "server 100".

Figure 2:
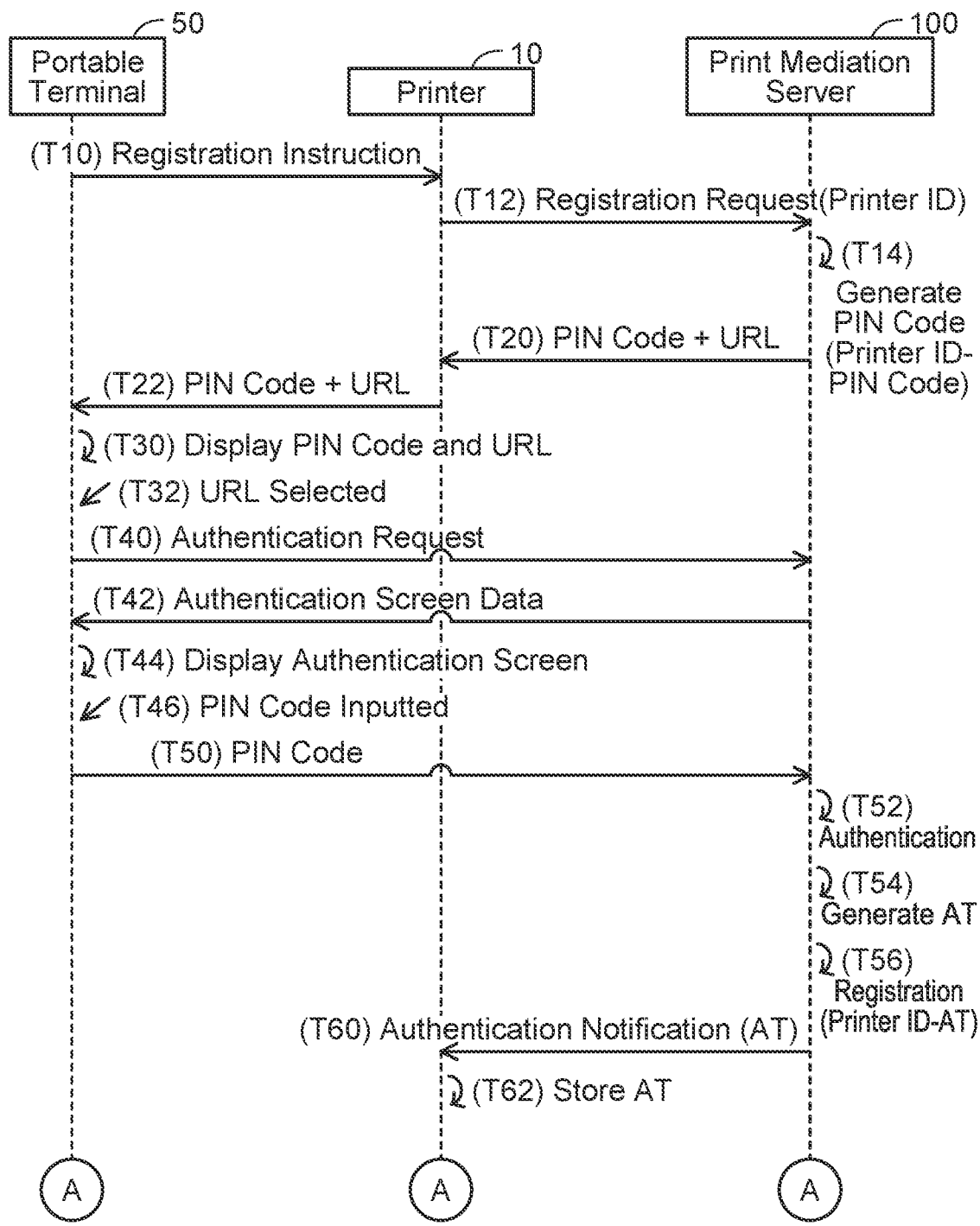
FIG. 2 illustrates a sequence diagram of a process to register information related to a printer in a print mediation server.

(Registration Process: FIG. 2)

Figure 5:
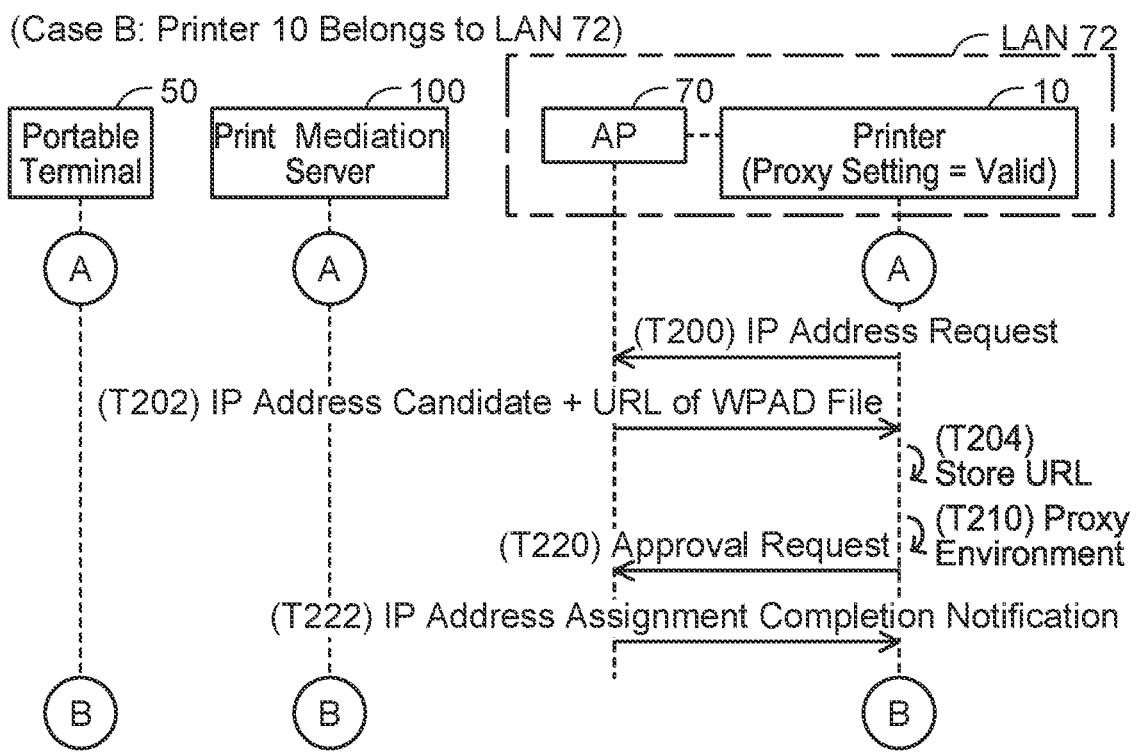
FIG. 5 illustrates a sequence diagram of Case B.

With reference to FIG. 2, a process for registering information related to the printer 10 in the server 100 in order for the printer 10 to receive the cloud print service from the server 100 will be described. In the initial state of FIG. 2, the printer 10 and the terminal 50 belong to the same LAN (e.g., the LAN 62 or the LAN 72). When the printer 10 belongs to the LAN 62, the printer 10 communicates with the terminal 50 and the server 100 by using the AP 60. When the printer 10 belongs to the LAN 72, the printer 10 communicates with the terminal 50 and the print mediation server 100 by using the AP 70 and communicates with the print mediation serve 100 by further using the proxy server 71. In FIG. 2, however, illustration of the AP 60, the AP 70 and the proxy server 71 is omitted. In sequence diagrams from FIG. 5, illustration of these devices is also omitted unless it is necessary.

In the following descriptions, for easier understanding, a process executed by the CPU 32 of the printer 10 in accordance with the program 36 will be described with the printer 10 as the subject of action instead of describing the CPU 32 as the subject of action. Further, all the communication executed by the printer 10 is executed via the wireless LAN interface 14. Thus, hereafter, when a process related to communication is described, the recitation "via the wireless LAN interface 14" will be omitted.

In response to accepting an operation from a user, the terminal 50 accesses for example a webserver in the printer 10. Then, in response to further accepting an operation for the printer 10 to receive the cloud print service from the user, the terminal 50 sends a registration instruction to the printer 10 in T10.

When the printer 10 receives the registration instruction from the terminal 50 in T10, the printer 10 sends a registration request including a printer ID which is information identifying the printer 10 to the server 100 in T12.

When the server 100 receives the registration request from the printer 10 in T12, the server 100 generates a PIN code in T14 and stores the printer ID included in the registration request and the generated PIN code in association with each other. Next, the server 100 sends the PIN code and a login Uniform Resource Locator (URL) to the printer 10 in T20. The login URL is information indicating a location of authentication screen data (to be described) in the server 100.

When the printer 10 receives the PIN code and the URL from the server 100 in T20, the printer 10 sends them to the terminal 50 in T22.

When the terminal 50 receives the PIN code and the URL from the printer 10 in T22, the terminal 50 displays them in T30. Then, when the terminal 50 accepts an operation to select the URL from the user in T32, the terminal 50 sends an authentication request including the URL to the server 100 in T40.

When the server 100 receives the authentication request from the terminal 50 in T40, the server 100 sends the authentication screen data identified by the URL included in the authentication request to the terminal 50 in T42. The authentication screen data is data representing an authentication screen to input a PIN code.

When the terminal 50 receives the authentication screen data from the server 100 in T42, the terminal 50 displays the authentication screen represented by the authentication screen data in T44. The terminal 50 then accepts input of the PIN code displayed in T30 from the user in T46. In this case, the terminal 50 sends the inputted PIN code to the server 100 in T50.

When the server 100 receives the PIN code from the terminal 50 in T50, the server 100 executes authentication of the received PIN code in T52. Specifically, the server 100 determines whether the received PIN code is already stored therein. When the server 100 determines that the received PIN code is already stored therein, in other words, when the authentication succeeds, the server 100 generates an access token (hereafter referred to as AT (Access Token)) which is a unique letter string) in T54. The server 100 stores the printer ID and the generated AT in association with each other in T56 and sends an authentication notification including the generated AT to the printer 10 in T60.

The printer 10 stores the AT included in the authentication notification in the memory 34 in T62. Consequently, the registration process ends.

Figure 3:
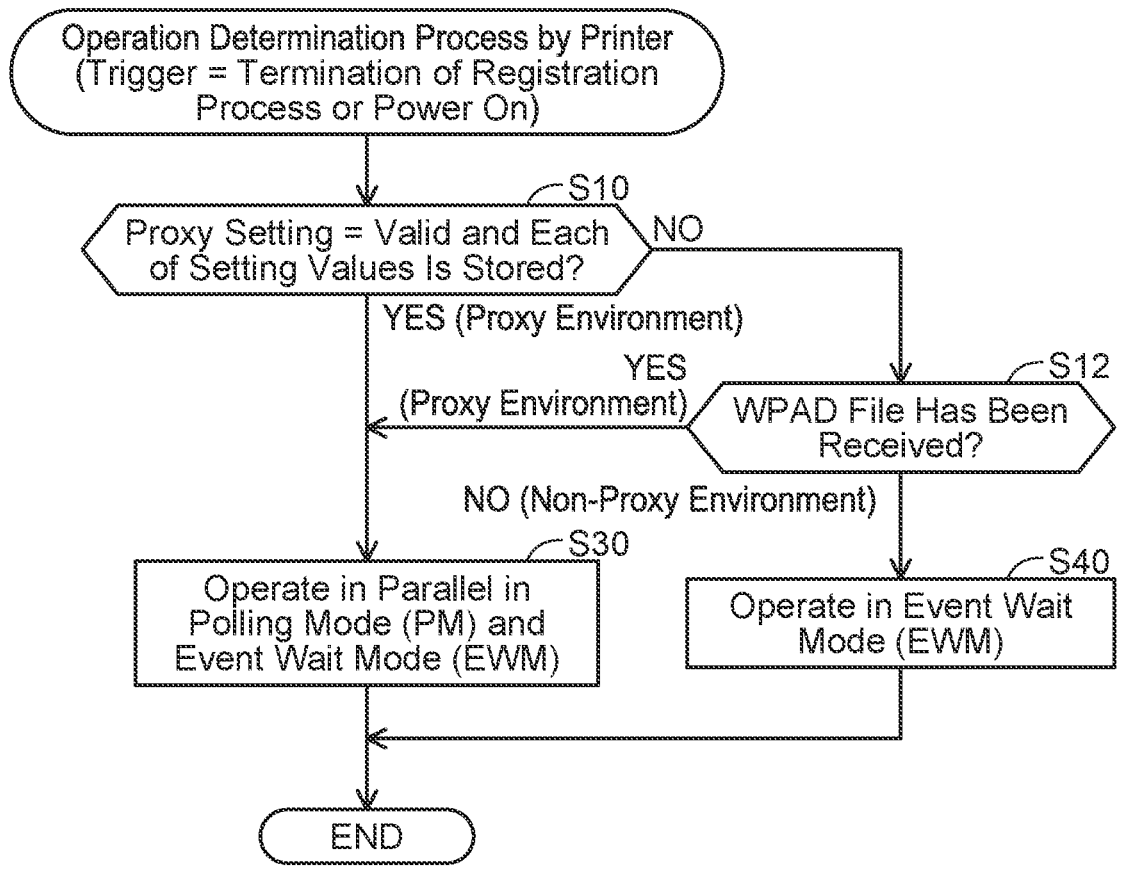
FIG. 3 illustrates a flowchart of an operation determination process.

(Operation Determination Process: FIG. 3)

Next, with reference to FIG. 3, an operation determination process executed by the CPU 32 of the printer 10 will be described. The start of the process of FIG. 3 is triggered by completion of the registration process or the printer 10 being powered on.

The processes of S10 and S12 are a series of processes to determine whether the printer 10 is in a proxy environment or in a non-proxy environment. The proxy environment is an environment in which the printer 10 communicates with a device on the Internet 6 by using the proxy server 71 (i.e., the situation in which the printer 10 belongs to the LAN 72). The non-proxy environment is an environment in which the printer 10 communicates with the device on the Internet 6 without using the proxy server 71 (i.e., the situation in which the printer 10 belongs to the LAN 62).

In S10, the printer 10 determines whether the flag information included in the proxy setting in the memory 34 indicates "valid" and each setting value (e.g., the IP address, the port number) is stored. When the flag information indicates "valid" and each setting value is stored, the printer 10 determines that the printer 10 is in the proxy environment (YES in S10) and proceeds to S30. On the other hand, when the flag information indicates "invalid" or when each setting value is not stored although the flag information indicates "valid" (NO in S10), the printer 10 proceeds to S12. Since the printer 10 executes the determination of S10 based on the proxy setting, it is possible to suitably determine whether the printer 10 is in the proxy environment or not.

In S12, the printer 10 determines whether a URL of a Web Proxy Auto-Discovery Protocol (WPAD) file is stored in the memory 34. Here, the WPAD will be described. When the printer 10 is to belong to the LAN 62 or the LAN 72, the printer 10 requests the AP 60 or the AP 70 to assign the IP address. Since the AP 60 and the AP 70 have DHCP server functions, they automatically assign the IP address to the printer 10. When the proxy server 71 is in the LAN 72, the AP 70 further sends the URL of the WPAD file to the printer 10 upon assignment of the IP address to the printer 10. The WPAD file is a file which indicates information related to the proxy server 71. Thus, when the printer 10 receives the URL of the WPAD file from the AP 70, it is possible to determine that the proxy server 71 is in the LAN 72, in other words, the printer 10 is in the proxy environment.

When the printer 10 belongs to the LAN 72, the printer 10 has already received the URL of the WPAD file from the AP70. Thus, the printer 10 determines the printer 10 is in the proxy environment (YES in S12) and proceeds to a process of S30. On the other hand, when the printer 10 belongs to the LAN 62, the printer 10 does not receive the WPAD file from the AP 60. Thus, the printer 10 determines that the printer 10 is not in the proxy environment (i.e., the printer 10 is in the non-proxy environment) (NO in S12) and proceeds to a process of S40. Since the printer 10 executes the determination of S12 based on whether it has received the URL of the WPAD file, it is possible to suitably determine whether the printer 10 is in the proxy environment.

In S30, the printer 10 operates in parallel in a Polling Mode (hereafter referred to as "PM") and an Event Wait Mode (hereafter referred to as "EWM"). The PM is a mode in which a polling signal is repeatedly sent to the server 100 to receive a notification from the server 100. The EWM is a mode to receive a notification from the server 100 without sending the polling signal to the server 100. When S30 ends, the process of FIG. 3 ends.

In the PM, the server 100 sends the notification to the printer 10 as a response to the polling signal from the printer 10. Consequently, sending of the notification about receipt of the print instruction from the server 100 to the printer 10 may be delayed. Consequently, start of printing may be delayed. In the EWM, on the other hand, the server 100 can send, to the printer 10, the notification about receipt of the print instruction immediately after receiving the print instruction from the terminal 50. Thus, this notification is promptly sent from the server 100 to the printer 10. Consequently, delay in the start of printing can be suppressed. As a result of research by the inventors of the present application, however, it has been found out that, if the printer 10 operates in the EWM when it is in the proxy environment, there is a possibility of an event in which the printer 10 cannot receive the notification from the server 100 (hereafter this event will be referred to as "non-receivable event").

Considering the above finding, in the present embodiment, the printer 10 operates in parallel in the PM and the EWM when it is in the proxy environment (S30). Thus, even if the non-receivable event occurs in the EWM, the printer 10 can suitably receive the notification from the server 100 in the PM. When the non-receivable event does not occur, the printer 10 can promptly receive the notification from the server 100 in the EWM. As described above, the printer 10 can promptly and suitably receive the notification from the server 100.

In S40, the printer 10 operates only in the EWM. When S40 ends, the process of FIG. 3 ends. As described above, in the present embodiment, the printer 10 operates only in the EWM when it is in the non-proxy environment (S40). This is because the non-receivable event is unlikely to occur when the printer 10 is in the non-proxy environment. Thus, the printer 10 can promptly and suitably receive the notification from the server 100 even when it operates only in the EWM. Further, since the printer 10 does not operate in parallel in the PM and the EWM, increase in processing load and communication load can be suppressed.

Figure 4:
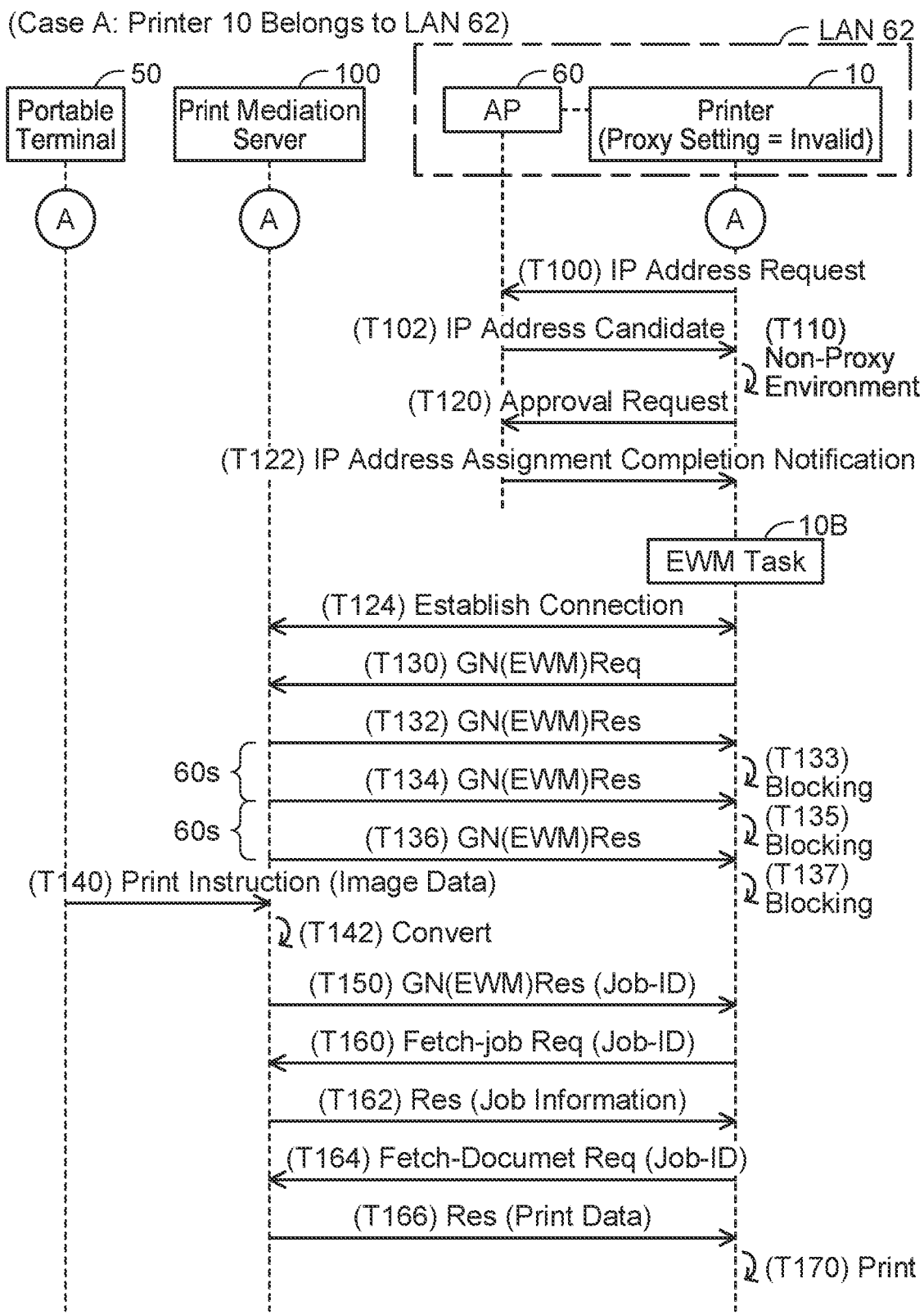
FIG. 4 illustrates a sequence diagram of Case A.

(Case A: FIG. 4)

Next, with reference to FIG. 4, Case A realized when the printer 10 belongs to the LAN 62 will be described. In Case A, the proxy setting of the printer 10 includes the flag information "invalid" and does not include each setting value. FIG. 4 is a process continued from FIG. 2. Although the illustration is omitted, the process of FIG. 4 starts in response to the printer 10 being powered off and then powered on after the process of FIG. 2. This point also applies to FIG. 5 to be described later, FIG. 9 and FIG. 10 of a second embodiment and FIG. 12 of a third embodiment.

When the printer 10 is powered on (trigger of the process of FIG. 3), the printer 10 belongs to the LAN 62 formed by the AP60 and sends an IP address request to the AP 60 in T100. In this case, the printer 10 receives a candidate of the IP address from the AP 60 in T102.

Since the flag information of the proxy setting indicates "invalid" (NO in S10) and the URL of the WPAD file has not been received (NO in S12), the printer 10 determines that the printer 10 is in the non-proxy environment in T110. Accordingly, the printer 10 operates in the EWM (S40).

Next, the printer 10 sends an approval request of the IP address to the AP 60 in T120 and receives an IP address assignment completion notification from the AP60 in T122. The subsequent communication executed by the printer 10 is executed via the AP 60. In FIG. 4, however, illustration of execution of communication via the AP 60 is omitted for easier understanding of the drawings. This point also applies to FIG. 6 and FIG. 7 to be described later, FIG. 9 of the second embodiment, FIG. 12 of the third embodiment and FIG. 13 of a fourth embodiment.

The printer 10 (i.e., the CPU 32) launches an EWM task 10B to operate in the EWM (in other words, a process thread). In T124, the EWM task 10B uses the stored AT (see T62 of FIG. 2) to establish a sustainable connection in accordance with the HTTP with the server 100. The sustainable connection is a so-called continuous connection and enables the server 100 to send a signal to the printer 10 without sending of a signal from the printer 10 to the server 100. In other words, the sustainable connection is a connection to execute server push communication.

Next, the EWM task 10B sends a Get-Notification (Event Wait Mode) Request (hereafter referred to as "GN(EWM) Req") to the server 100 in T130. The GN(EWM)Req is a signal to request the server 100 to, when the server 100 receives the print instruction from the terminal 50, send a notification about the receipt of the print instruction to the printer 10. Consequently, when the server 100 receives the print instruction from the terminal 50, the server 100 sends a Get-Notification (Event Wait Mode) Response (hereafter referred to as "GN(EWM)Res") including a Job-ID to the printer 10. On the other hand, each time a predetermined waiting period elapses without receiving the print instruction from the terminal 50, the server 100 sends the GN(EWM) Res not including the Job-ID to the printer 10. The predetermined waiting period is for example 60s (seconds).

When the EWM task 10B sends the GN(EWM)Req in T130, the EWM task 10B receives the GN(EWM)Res not including the Job-ID from the server 100 in T132 immediately after the GN(EWM)Req is sent. Thereafter, in T134 and in T136, the EWM task 10B receives the GN(EWM)Res not including the Job-ID from the server 100 every 60 s.

When the EWM task 10B receives the GN(EWM)Res of T132, T134, and T136, the EWM task 10B shifts to a blocking state in T133, T135, and T137, respectively. The blocking state is a state in which a different process cannot be executed until the GN(EWM)Res is received again. In other words, the blocking state is a state in which receipt of the GN(EWM)Res alone is monitored. Consequently, the GN(EWM)Res can be suppressed from being received while the EWM task 10B is executing the different process. Accordingly, in response to receiving the GN(EWM)Res in the blocking state, the EWM task 10B can promptly execute the process in accordance with this GN(EWM)Res.

As described above, in the present embodiment, the GN(EWM)Res not including the Job-ID is sent from the server 100 to the printer 10 every 60 s. Thus, when the EWM task 10B receives the GN(EWM)Res, the EWM task 10B maintains the blocking state over a period longer than 60 s (e.g., 90 s). When the EWM task 10B receives the GN(EWM)Res in the blocking state, the EWM task 10B cancels the blocking state and executes the process in accordance with this GN(EWM)Res. For example, the EWM task 10B determines whether this GN(EWM)Res includes the Job-ID or not, and shifts to the blocking state again when this GN(EWM)Res does not include the Job-ID, whereas on the other hand executes a process related to printing when this GN(EWM)Res includes the Job-ID.

In response to accepting a print execution operation from a user, the terminal 50 sends the print instruction to the server 100 in T140. The print instruction includes image data representing an image to be printed designated by the user. Before 60 s elapses from when the server 100 sent the GN(EWM)Res of T136, the server 100 receives the print instruction from the terminal 50 in T140. In this case, the server 100 converts the received image data in T142 and generates print data which has a data format the printer 10 can interpret. The server 100 further generates the Job-ID and stores the print data and the Job-ID in association with each other. Then, before 60 s elapses from when the GN(EWM)Res of T136 was sent, in other words, immediately after the server 100 has received the print instruction from the terminal 50, the server 100 uses the above sustainable connection to send the GN(EWM)Res including the Job-ID to the printer 10 in T150.

When the EWM task 10B receives the GN(EWM)Res including the Job-ID from the server 100 by using the sustainable connection in T150, the EWM task 10B cancels the blocking state and communicate with the server 100 to receive the print data in T160 to T166. Specifically, the EWM task 10B sends a Fetch job Request including the Job-ID to the server 100 in T160 and receives a Response including Job information from the server 100 in T162. The Job information is information indicating print conditions set by the user of the terminal 50 (e.g., paper size, number of colors, double-side printing or not). Then, the EWM task 10B sends a Fetch-Document Request including the Job-ID to the server 100 in T164 and receives a Response including print data associated with the Job-ID from the server 100 in T166.

Next, the EWM task 10B causes the print execution unit 18 to print the image represented by the print data in T170. Specifically, the EWM task 10B supplies the print data to the print execution unit 18. Consequently, the print execution unit 18 starts printing, and after the printing is finished, the printed sheet(s) are provided to the user of the terminal 50.

As described in Case A, the printer 10 operates only in the EWM when the printer 10 is in the non-proxy environment. Due to this, the printer 10 can promptly and suitably receive the GN(EWM)Res including the Job-ID (T150).

(Case B; FIG. 5)

Next, with reference to FIG. 5, Case B realized when the printer 10 belongs to the LAN 72 will be described. In Case B, the proxy setting of the printer 10 includes the flag information "valid" and each setting value.

In T200, the printer 10 sends the IP address request to the AP 70. In this case, in T202, the printer 10 receives a candidate of the IP address to be set for the printer 10 and the URL of the WPAD file from the AP 70. In T204, the printer 10 stores the received URL in the memory 34.

Since the flag information indicates "valid" and each setting value is stored in the proxy setting, the printer 10 determines that the printer 10 is in the proxy environment in T210 (YES in S10 of FIG. 3). Accordingly, the printer 10 operates in parallel in the PM and the EWM (S30).

Next, the printer 10 sends the approval request of the IP address to the AP 70 in T220 and receives the IP address assignment completion notification from the AP 70 in T222.

Figure 6:
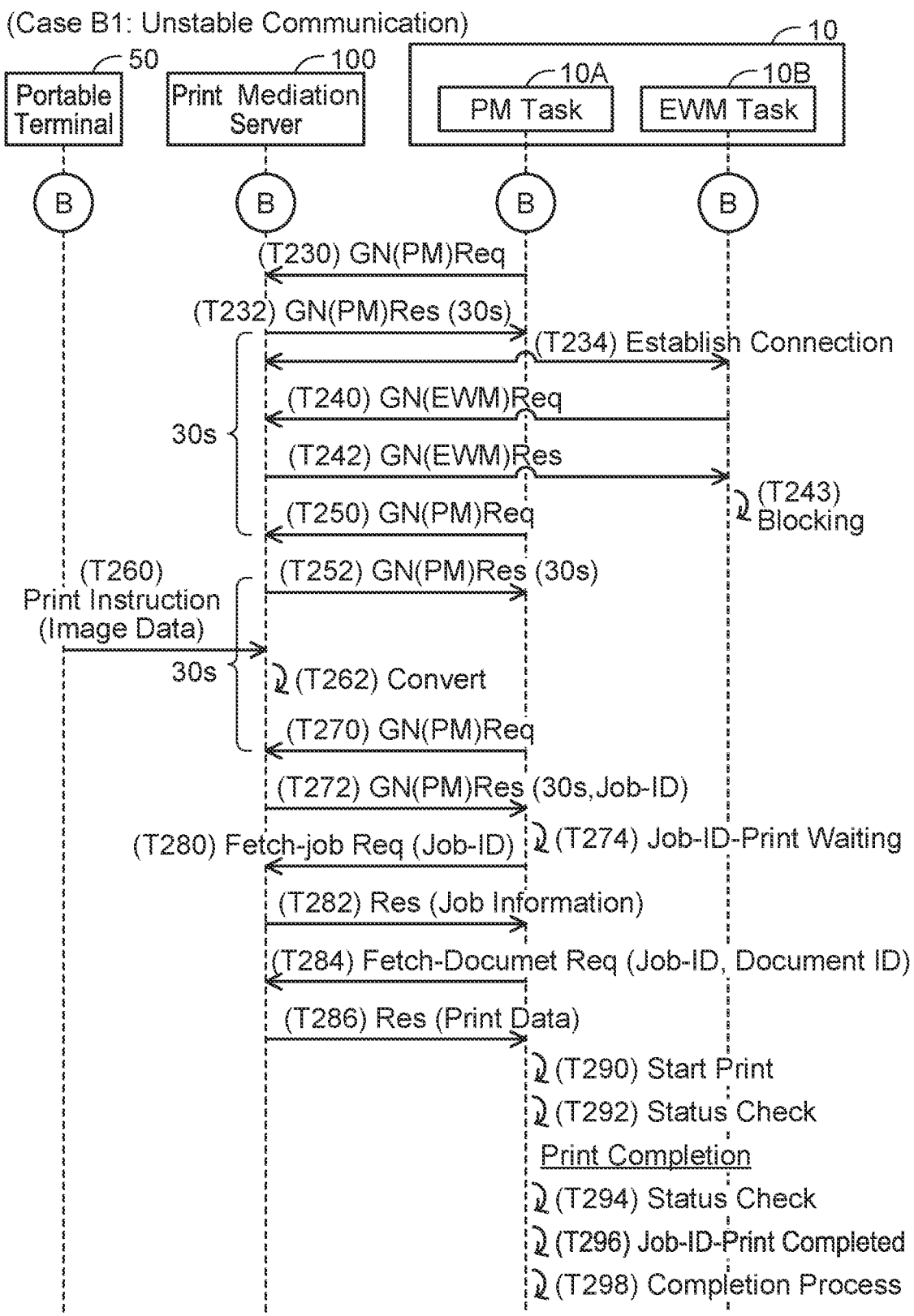
FIG. 6 illustrates a sequence diagram of Case B 1.

(Case B1: FIG. 6 (Case in which Communication is Unstable))

Case B1 of FIG. 6 is continuation of FIG. 5. In particular, FIG. 6 is a case in which the non-receivable event occurs. The printer 10 (e.g., the CPU 32) launches each of a PM task 10A to operate in the PM and the EWM task 10B to operate in the EWM. Due to this, the PM task and the EWM task can execute processes in parallel, as a result of which it can be realized that the printer 10 operates in parallel in the PM and the EWM.

The PM task 10A sends a Get-Notification (Polling Mode) Request (hereafter referred to as "GM(PM)Req") to the server 100 in T230 and receives a Get-Notification (Polling Mode) Response (hereafter referred to as "GN(PM)Res") not including the Job-ID from the server 100 in T232 immediately after the GN(PM)Req is sent. The GN(PM)Res includes polling period information indicating 30s designated by the server 100. The polling period information indicates a period from receipt of the GN(PM)Res to sending of the next GN(PM)Req.

On the other hand, in T234, the EWM task 10B uses the stored AT (see T62 of FIG. 2) to establish the sustainable connection in accordance with the HTTP with the server 100. This connection is the same as the connection of T124 of FIG. 4. Next, the EWM task 10B sends the GN(EWM) Req to the server 100 in T240 and receives the GN(EWM) Res not including the Job-ID from the server 100 in T242 immediately after the GN(EWM)Req is sent. Then, the EWM task 10B shifts to the blocking state in T243.

For illustration of the drawings, FIG. 6 illustrates as if the PM task 10A first executes processes such as T230 and then the EWM task 10B executes processes such as T240. However, the EWM task 10B may first execute the processes, or the PM task 10A and the EWM task 10B may execute the processes simultaneously. This point also applies to the other drawings in which both the PM task 10A and the EWM task 10B are launched.

When 30 s indicated by the polling period information included in the GN(PM)Res of T232 elapses after this GN(PM)Res is received, the PM task 10A sends the GN(PM)Req to the server 100 in T250 and receives the GN(PM)Res not including the Job-ID from the server 100 in T252 immediately after the GN(PM)Req is sent. As described above, each time 30s indicated by the polling period information elapses, the PM task 10A sends the GN(PM)Req to the server 100.

When the server 100 receives the print instruction from the terminal 50 in T260 before 30 s elapses from when the GN(PM)Res of T252 is sent, the server 100 generates print data and stores the print data and the Job-ID in association with each other in T262. Then, the server 100 uses the aforementioned sustainable connection to attempt to send the GN(EWM)Res including the Job-ID to the printer 10. However, since the non-receivable event occurs in Case B 1, the GN(EWM)Res including the Job-ID cannot be received by the printer 10.

Thereafter, the PM task 10A sends the GN(PM)Req to the server 100 in T270 and receives the GN(PM)Res including the polling period information and the Job-ID from the server 100 in T272. In this case, the PM task 10A stores this Job-ID and status information "print waiting" in a status table in the memory 34 in T270 in association with each other. Next, the PM task 10A communicates with the server 100 to receive the print data in T280 to T286. The processes of T280 to T286 are the same as T160 to T166 of FIG. 4 except that the processes are executed by the PM task 10A instead of the EWM task 10B.

When the PM task 10A receives the print data from the server 100 in T286, the PM task 10A causes the print execution unit 18 to print the image represented by the print data in T290.

Thereafter, the PM task 10A executes a status check to check whether all printings in accordance with the print data have been completed in T292. Specifically, the PM task 10A supplies a status request to the print execution unit 18 to obtain the status information from the print execution unit 18. When the PM task 10A obtains the status information "printing", the PM task 10A executes the status check again. As described above, the PM task 10A repeatedly executes the status check. A time interval to repeatedly execute the status check is for example 5s. Although not illustrated, when the PM task 10A obtains the status information "printing", the PM task 10A stores the status information "printing" instead of the status information "print waiting" in the status table in association with the aforementioned Job-ID.

After the status check of T292 is performed, printing is completed. In this case, the PM task 10A executes the status check in T294 and obtains the status information "print completed", and stores the status information "print completed" instead of the status information "printing" in the status table in association with the above Job-ID in T296.

Next, the PM task 10A executes a completion process in T298. The completion process includes, for example, a process to delete the print data from the memory 34 and a process to notify the server 100 of completion of printing. As described above, since the PM task 10A executes the status check in the present embodiment, the printer 10 can promptly execute the status check as compared to the configuration in which the EWM task 10B executes the status check. This is because the EWM task 10B maintains the blocking state for a long period of time and thus cannot execute the status check frequently. Accordingly, in the present embodiment, the printer 10 can promptly execute the completion process.

Although not illustrated, when the process of T298 ends, the PM task 10A restarts to repeatedly send the GN(PM)Req to the server 100. Further, each time the blocking state is cancelled without receiving the GN(EWM)Res, the EWM task 10B sends the GN(EWM)Req to the server 100.

As described in Case B1 discussed above, the printer 10 operates in parallel in the PM and the EWM when it is in the proxy environment. Due to this, even when the non-receivable event occurs in the EWM, the printer 10 can suitably receive the GN(PM)Res including the Job-ID in the PM (T272).

Figure 7:
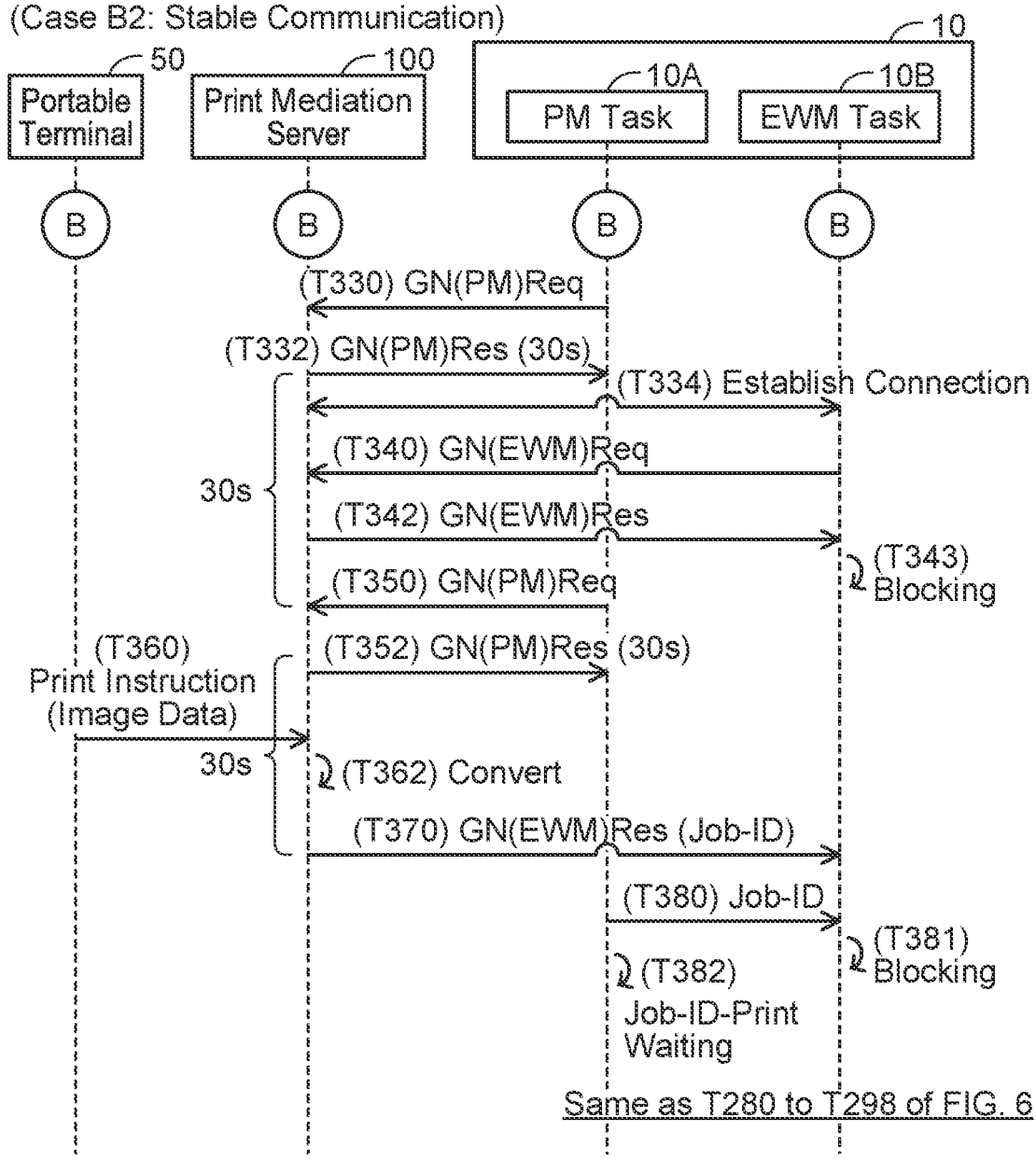
FIG. 7 illustrates a sequence diagram of Case B2.

(Case B2: FIG. 7 (Case in which Communication is Stable))

Case B2 is a case in which the non-receivable event does not occur in the EWM. T330 to T362 are the same as T230 to T262 of FIG. 6. Since the non-receivable event does not occur in the EWM in Case B2, the EWM task 10B uses the above sustainable connection to receive the GN(EWM)Res including the Job-ID from the server 100 in T370 before 30 s elapses from when the GN(PM)Res of T352 is received, in other words, immediately after the print instruction is sent from the terminal 50 to the server 100.

When the EWM task 10B receives the GN(EWM)Res in T370, the EWM task 10B cancels the blocking state and supplies the Job-ID included in this GN(EWM)Res to the PM task 10A in T380. Then, the EWM task 10B shifts to the blocking state again in T381.

When the PM task 10A obtains the Job-ID from the EWM task 10B in T380, the PM task 10A stores this Job-ID and the status information "print waiting" in the status table in association with each other in T382. The subsequent processes are the same as T280 to T298 of FIG. 6. Since the PM task 10A executes the status check in the present case as well, the printer 10 can promptly execute the completion process. Further, since not the EWM task 10B but the PM task 10A executes the process to receive print data from the server 100, the EWM task 10B can promptly shift to the blocking state (T381). Consequently, the EWM task 10B can promptly receive the GN(EWM)Res from the server 100. Due to this, the printer 10 can, for example, promptly receive the GN(EWM)Res including a new Job-ID and promptly print in accordance with the new Job-ID. Further the printer 10 can, for example, promptly receive the GN(EWM)Res including print cancellation information and promptly stop the printing.

As described in Case B2 discussed above, the printer 10 operates in parallel in the PM and the EWM when it is in the proxy environment. Due to this, when the non-receivable event does not occur, the printer 10 can promptly receive the GN(EWM)Res including the Job-ID in the EWM (T370).

(Corresponding Relationships)

The printer 10 and the server 100 are an example of "communication device" and "notification server", respectively. The PM and the EWM are an example of "first mode" and "second mode", respectively. The print instruction is an example of "process executing instruction". The GN(EWM) Res including the Job-ID or the GN(PM)Res including the Job-ID is an example of "process executing notification". The GN(PM)Req is an example of "polling signal". Printing is an example of "predetermined process". The case of YES in S10 of FIG. 3 or the case of YES in S12 of FIG. 3 is an example of "a case where a first condition is satisfied". The case of NO in S12 is an example of "a case where a second condition is satisfied" The WPAD file is an example of "existence information". The PM task 10A and the EWM task 10B are an example of "first task" and "second task", respectively.

The processes to receive the GN(EWM)Res including the Job-ID or the GN(PM)Res including the Job-ID in FIG. 4, FIG. 6 and FIG. 7 (e.g., T124 to T136 and T150 of FIGS. 4, T230 to T252, T270, T272 of FIG. 6, and T330 to T352 and T370 of FIG. 7) are examples of "receive a process executing notification". T170 of FIGS. 4 and T290 of FIG. 6 are examples of "execute a predetermined process".

Figure 8:
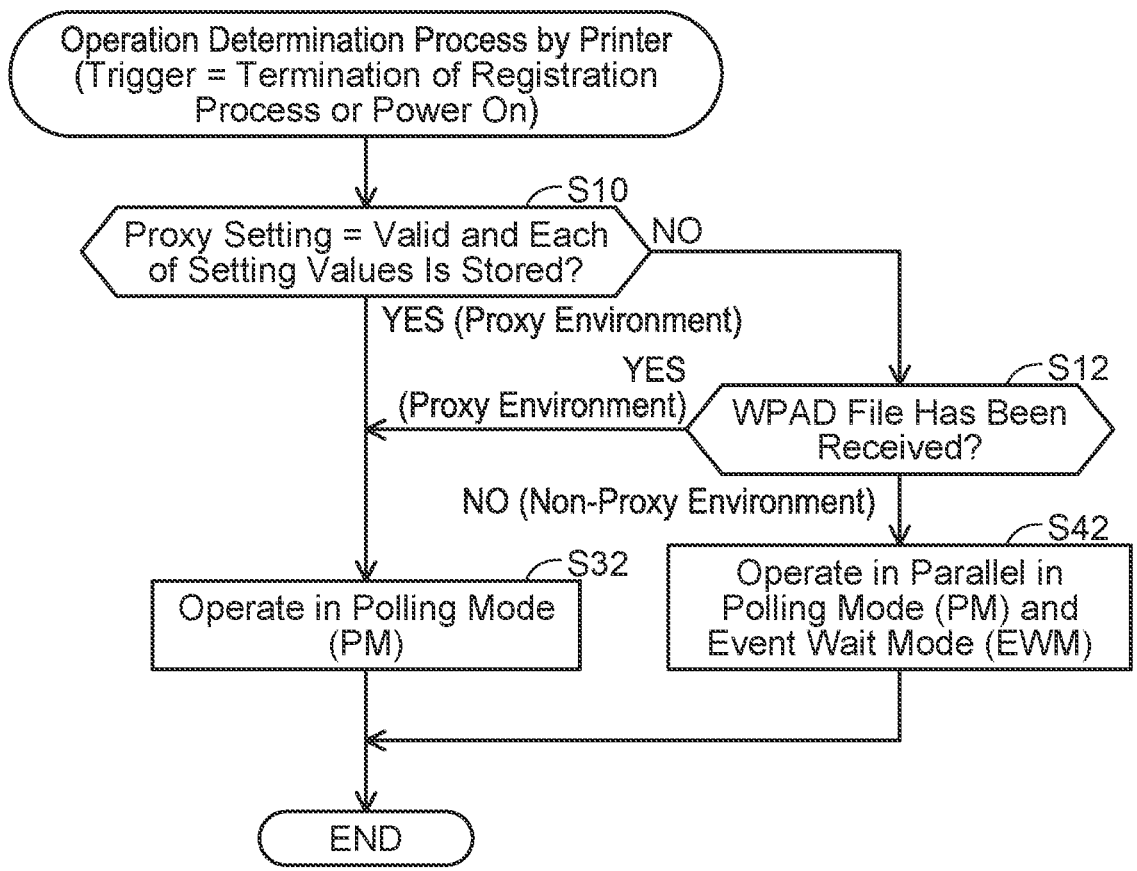
FIG. 8 illustrates a flowchart of an operation determination process of a second embodiment.

Second Embodiment: FIG. 8

Next, the second embodiment will be described. In the second embodiment, the process of FIG. 8 is executed instead of the process of FIG. 3.

S10 and S12 of FIG. 8 are the same as S10 and S12 of FIG. 3. In the case of YES in S10 or YES in S12, in other words, when the printer 10 determines that the printer 10 is in the proxy environment, the printer 10 operates only in the PM in S32. As described above, when the printer 10 is in the proxy environment, the non-receivable event may occur in the EWM. Since the printer 10 of the present embodiment operates only in the PM when the printer 10 is in the proxy environment, the printer 10 can suitably receive the GN(PM)Res including the Job-ID from the server 100. Further, since the printer 10 does not operate in parallel in the PM and the EWM, increase in processing load and communication load can be suppressed.

In the case of NO in S12, in other words, when the printer 10 determines that the printer 10 is in the non-proxy environment, the printer 10 operates in parallel in the PM and the EWM in S42. As described above, when the printer 10 is in the non-proxy environment, the non-receivable event is unlikely to occur in the EWM. However, a likelihood of the non-receivable event cannot be denied even when the printer 10 is in the non-proxy environment. Due to this, the printer 10 of the present embodiment operates in parallel in the PM and the EWM when the printer 10 is in the non-proxy environment. Consequently, the printer 10 can suitably receive the GN(PM)Res including the Job-ID from the server 100 in the PM even if the non-receivable event occurs in the EWM. When the non-receivable event does not occur, the printer 10 can promptly receive the GN(EWM)Res including the Job-ID from the server 100 in the EWM.

Figure 9:
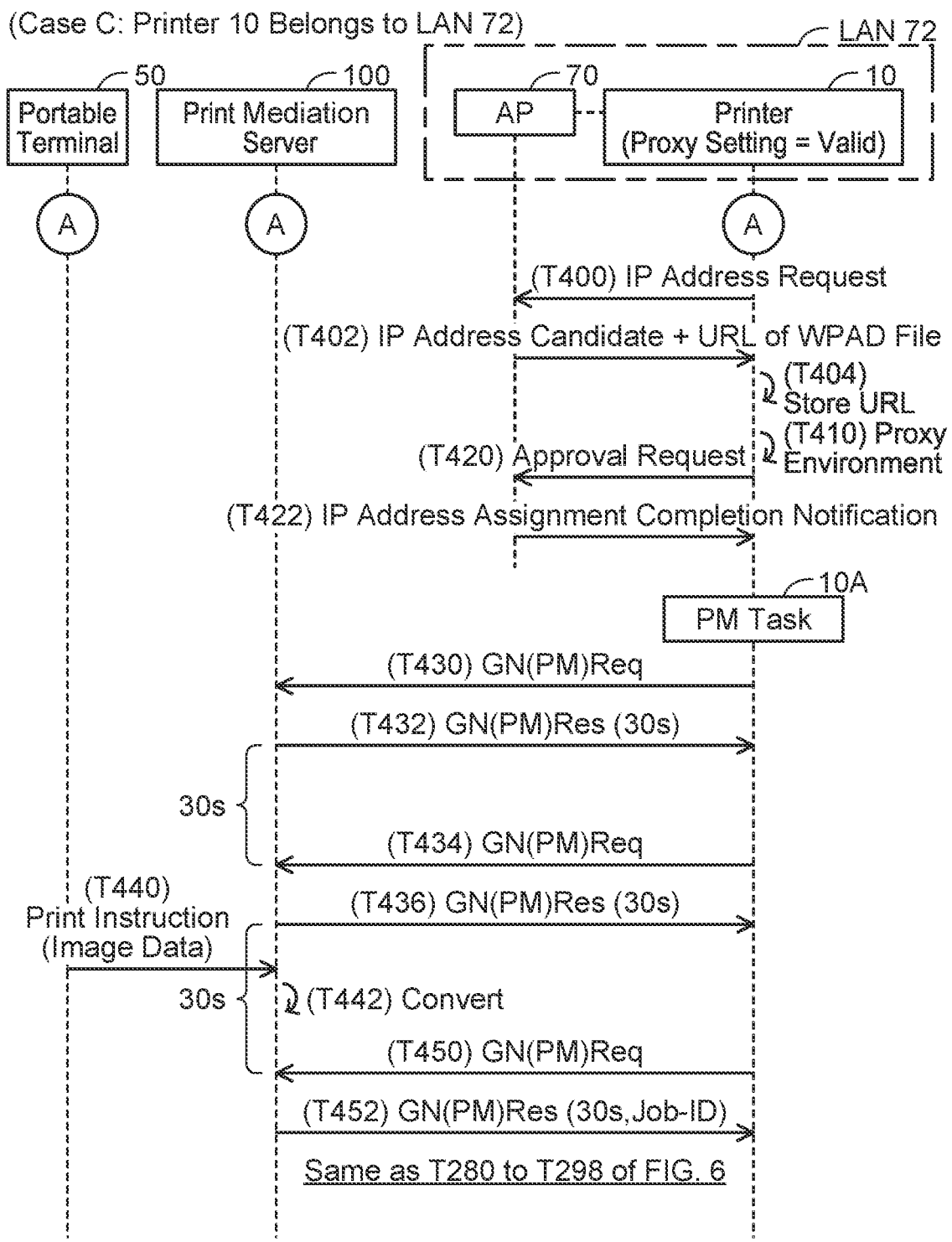
FIG. 9 illustrates a sequence diagram of Case C.

(Case C: FIG. 9)

With reference to FIG. 9, Case C realized when the printer 10 belongs to the LAN 72 will be described. In Case C, the proxy setting of the printer 10 includes the flag information "valid" and each setting value.

T400 to T422 are the same as T200 to T222 of FIG. 5. The printer 10 launches the PM task 10A. The PM task 10A sends the GN(PM)Req to the server 100 in T430 and receives the GN(PM)Res not including the Job-ID from the server 100 in T432. When 30 s indicated by the polling period information elapses from when the GN(PM)Res of T432 is received, the PM task 10A sends the GN(PM)Req again to the server 100 in T434 and receives the GN(PM)Res not including the Job-ID from the server 100 in T436. In other words, the PM task 10A repeatedly sends the GN(PM) Req to the server 100 and repeatedly receives the GN(PM) Res from the server 100.

When the server 100 receives the print instruction from the terminal 50 in T440 before 30 s elapses from when the GN(PM)Res of T436 is sent, the server 100 generates print data in T442 and stores this print data and the Job-ID in association with each other. Thereafter, when 30 s elapses from when the GN(PM)Res of T436 is sent, the server 100 receives the GN(PM)Req from the printer 10 in T450. In this case, the server 100 sends the GN(PM)Res including the polling period information and the Job-ID to the printer 10 in T452.

When the PM task 10A receives the GN(PM)Res including the Job-ID from the server 100 in T452, the PM task 10A executes the process same as T280 to T298 of FIG. 6. Although not illustrated, the PM task 10A repeatedly sends the GN(PM)Req to the server 100 when the process of T298 ends.

As described in Case C discusses above, the printer 10 operates only in the PM when it is in the proxy environment. Due to this, the printer 10 can suitably receive the GN(PM) Res including the Job-ID (T452). Further, since the printer 10 does not operate in parallel in the PM and the EWM, increase in processing load and communication load can be suppressed.

Figure 10:
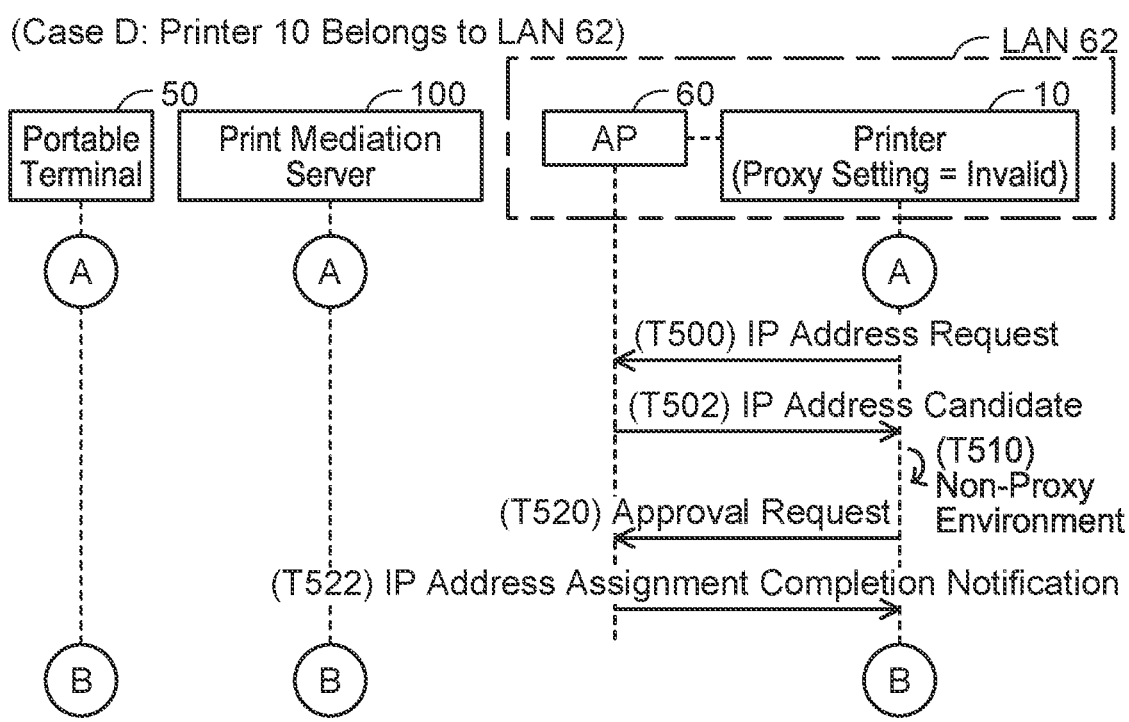
FIG. 10 illustrates a sequence diagram of Case D.

(Case D: FIG. 10)

With reference to FIG. 10, Case D realized when the printer 10 belongs to the LAN 62 will be described. In Case D, the proxy setting of the printer 10 include the flag information "invalid" and does not include each setting value.

T500 to T522 are the same as T100 to T122 of FIG. 4. The subsequent processes are the same as the process of Case B1 of FIG. 6 or Case B2 of FIG. 7. The printer 10 operates in parallel in the PM and the EWM when it is in the non-proxy environment. Due to this, even when the non-receivable event occurs in the EWM as described in Case B1 of FIG. 6, the printer 10 can suitably receive the GN(PM)Res including the Job-ID in the PM (T272 of FIG. 6). Further, when the non-receivable event does not occur as in Case B2 of FIG. 7, the printer 10 can promptly receive the GN(EWM)Res including the Job-ID in the EWM (T370 of FIG. 7).

(Corresponding Relationships)

The case of NO in S12 of FIG. 8 is an example of "a case where a first condition is satisfied". The case of YES in S10 or YES in S12 of FIG. 8 are an example of "a case where a second condition is satisfied". The processes to receive the GN(EWM)Res including the Job-ID or the GN(PM)Res including the Job-ID in FIG. 6 referred to in FIG. 9 and FIG. 10, and in FIG. 7 referred to in FIG. 10 (e.g., T430 to T436, T450, T452 of FIG. 9) are examples of "receive a process executing notification".

Figure 11:
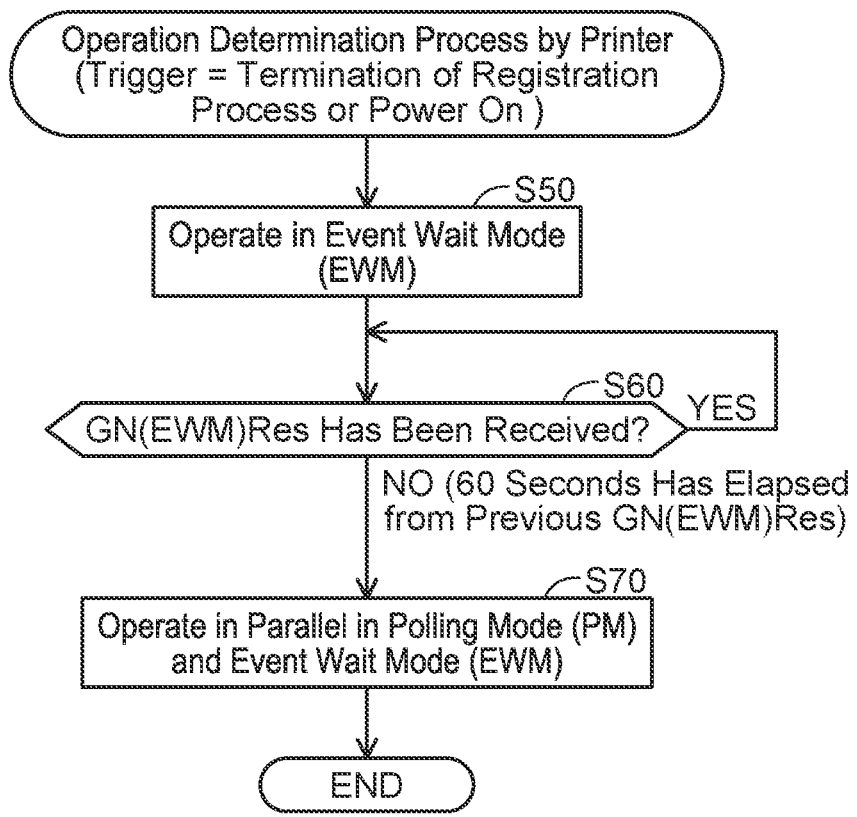
FIG. 11 illustrates a flowchart of an operation determination process of a third embodiment.

Third Embodiment: FIG. 11

Next, the third embodiment will be described. In the third embodiment, a process of FIG. 11 is executed instead of the process of FIG. 3. In the process of FIG. 11, a mode in which the printer 10 is to operate is determined depending on whether the printer 10 periodically receives the GN(EWM) Res regardless of whether the printer 10 is in the proxy environment or in the non-proxy environment.

In S50, the printer 10 firstly operates in the EWM. In other words, the printer 10 establishes the sustainable connection with the server 100 and sends the GN(EWM)Req to the server 100.

In S60, the printer 10 monitors receipt of the GN(EWM) Res not including the Job-ID from the server 100. In the present embodiment, the GN(EWM)Res not including the Job-ID is sent from the server 100 to the printer 10 every 60 s. In a modification, a period different from 60 s may be set. When the printer 10 receives the GN(EWM)Res not including the Job-ID from the server 100 every 60 s, the printer 10 determines YES in S60 and keeps operating in the EWM. On the other hand, when the printer 10 does not receive the GN(EWM)Res not including the Job-ID from the server 100 even when 60 s elapses from when the GN(EWM)Req is sent, or when the printer 10 does not receive the GN(EWM) Res not including the Job-ID from the server 100 even when 60 s elapses from when the previous GN(EWM)Res is received from the server 100, the printer 10 determines NO in S60 and proceeds to S70.

In S70, the printer 10 operates in parallel in the PM and the EWM. Consequently, the printer 10 can suitably receive the GN(PM)Res including the Job-ID from the server 100 in the PM even if the non-receivable event occurs in the EWM. Further, when the non-receivable event does not occur, the printer 10 can promptly receive the GN(EWM)Res including the Job-ID from the server 100 in the EWM.

(Case E: FIG. 12)

With reference to FIG. 12, Case E realized by the process of FIG. 11 will be described. In Case E, the printer 10 may belong to either the LAN 62 or the LAN 72. In other words, the printer 10 may be either in the proxy environment or in the non-proxy environment. When the printer 10 belongs to the LAN 62, the printer 10 executes the same process as T100 to T122 of FIG. 4. On the other hand, when the printer 10 belongs to the LAN 72, the printer 10 executes the same process as T200 to T222 of FIG. 5.

The printer 10 firstly operates in the EWM (S50 of FIG. 11). The printer 10 launches the EWM task 10B. Then, the EWM task 10B establishes the sustainable connection with the server 100 in T600. Next, the EWM task 10B sends the GN(EWM)Req to the server 100 in T610, and immediately after that, the EWM task 10B receives the GN(EWM)Res not including the Job-ID from the server 100 in T612. The EWM task 10B receives the GN(EWM)Res not including the Job-ID from the server 100 every 60 s in T614 and in T616 (YES in S60). In this case, the printer 10 keeps operating in the EWM.

Thereafter, the non-receivable event occurs in the printer 10. As described above, for example, when the printer 10 is in the proxy environment, the non-receivable event may occur. Further, even when the printer 10 is in the non-proxy environment as well, the non-receivable event may occur. The EWM task 10B does not receive the GN(EWM)Res not including the Job-ID from the server 100 even when 60 s elapses from when the GN(EWM)Res of T616 is received (NO in S60). In this case, the printer 10 starts to operate in parallel in the PM and the EWM (S70).

The printer 10 firstly disconnects the aforementioned sustainable connection in T618. Then, the printer 10 executes the same process as Case B1 of FIG. 6 or Case B2 of FIG. 7. As described in Case E discussed above, when the printer 10 does not receive the GN(EWM)Res from the server 100, in other words, when the non-receivable event occurs, the printer 10 operates in parallel in the PM and the EWM. Due to this, even when the non-receivable event occurs, the printer 10 can suitably receive the GN(PM)Res including the Job-ID in the PM (T272 of FIG. 6). Further, in the situation where the non-receivable event does not occur, the printer 10 can promptly receive the GN(EWM)Res including the Job-ID from the server 100 (T370 of FIG. 7).

(Corresponding Relationships)

The GN(EWM)Res not including the Job-ID is an example of "predetermined signal". 60s is an example of "predetermined period". The case of NO in S60 of FIG. 9 is an example of "a case where a first condition is satisfied". The case of YES in S60 is an example of "a case where a second condition is satisfied". The processes to receive the GN(EWM)Res including the Job-ID or the GN(PM)Res including the Job-ID in FIG. 6 and FIG. 7 referred to in FIG. 12 are examples of "receive a process executing notification".

Fourth Embodiment: FIG. 13

With reference to FIG. 13, the fourth embodiment will be described. In the first to third embodiments discussed above, when both the PM task 10A and the EWM task 10B are launched, the PM task 10A receives the print data from the server 100 and executes the status check on the print execution unit 18. In the present embodiment, a thread pool 10C is used instead of the PM task 10A, and the EWM task 10B receives the print data and executes the status check.

The thread pool 10C is a task which executes processes in accordance with queuing instruction in response to obtaining the queueing instruction from various tasks. For example, in response to obtaining the queuing instruction from the EWM task 10B, the thread pool 10C executes a process to send the GN(PM)Req to the server 100. In other words, the thread pool 10C can operate as a PM task or as a different task.

FIG. 13 illustrates Case F realized instead of Case B1 of FIG. 6 of the first embodiment. In Case F, the EWM task 10B firstly establishes the sustainable connection with the server 100 in T700. Then, the EWM task 10B sends the GN(EWM)Req to the server 100 in T710 and receives the GN(EWM)Res not including the Job-ID from the server 100 in T712.

Next, the EWM task 10B supplies the queuing instruction to the thread pool 10C in T714. In T716, the EWM task 10B shifts to the blocking state. In the present embodiment, a period for which the blocking state is maintained is shorter than 90 s of the first embodiment. For example, this period is 30 s.

When the thread pool 10C obtains the queuing instruction from the EWM task 10B in T714, the thread pool 10C sends the GN(PM)Req to the server 100 in T720 and receives the GN(PM)Res not including the Job-ID from the server 100 in T722.

When the server 100 receives the print instruction from the terminal 50 in T730 before 30 s elapses from when the GN(PM)Res of T722 is sent, the server 100 generates print data in T732 and stores this print data and the Job-ID in association with each other. Since the non-receivable event occurs in Case F, the GN(EWM)Res including the Job-ID is not received by the printer 10.

Thereafter, the EWM task 10B cancels the blocking state and supplies the queuing instruction to the thread pool 10C in T734. Next, the EWM task 10B shifts to the blocking state in T736.

When the thread pool 10C obtains the queuing instruction from the EWM task 10B in T734, the thread pool 10C sends the GN(PM)Req to the server 100 in T740 and receives the GN(PM)Res including the Job-ID from the server 100 in T742. In this case, the thread pool 10C stores this Job-ID and the status information "print waiting" in the status table in association with each other in T744.

Thereafter, the EWM task 10B cancels the blocking state and recognizes that the Job-ID and the status information "print waiting" are associated with each other in the status table in T746. In this case, the EWM task 10B communicates to receive the print data in T750 to T756. T750 to T756 are the same as T160 to T166 of FIG. 4.

When the EWM task 10B receives the print data from the server 100 in T756, the EWM task 10B causes the print execution unit 18 to start printing an image represented by the image data in T760. Thereafter, the EWM task 10B executes the status check on the print execution unit 18 in T762. After the status check of T762 is executed, the printing ends. In this case, the EWM task 10B executes the status check and obtains the status information "print completed" in T764, and stores the status information "print completed" instead of the status information "printing" in the status table in association with the aforementioned Job-ID in T766.

Next, the EWM task 10B executes the completion process in T768. As described above, in the present embodiment, since the EWM task 10B receives the print data and executes the status check, it is enough to provide the thread pool 10C which can execute various processes including the processes related to the PM. Since it is not necessary to provide a dedicated task to operate in the PM, it is possible to effectively use the resource of the printer 10. In the present embodiment, the thread pool 10C is an example of "first task".

While specific examples of the present disclosure have been described above in detail, these examples are merely illustrative and place no limitation on the scope of the patent claims. The technology described in the patent claims also encompasses various changes and modifications to the specific examples described above. Modifications of the above embodiments are listed below.

(Modification 1) The printer 10 may be configured to operate in parallel in the PM and the EWM at all times for example without executing the determination in S10 or S12 of FIG. 3. In general terms, "receive a process executing notification" may be executed by operating in parallel in the first mode and the second mode regardless of which of the first condition and the second condition is satisfied.

(Modification 2) The printer 10 may operate only in the PM in S40 of FIG. 3. In general terms, "receive a process executing notification" may be executed by operating only in the first mode among the first mode and the second mode when the second condition that the communication device in the non-proxy environment is satisfied.

(Modification 3) In S32 of FIG. 8, the printer 10 may operate only in the EWM. In general terms, "receive a process executing notification" may be executed by operating only in the second mode among the first mode and the second mode when the second condition that the communication device is in the proxy environment is satisfied.

(Modification 4) S10 of FIG. 3 may be omitted. In this case, only the determination of S12 is executed, and the printer 10 proceeds to S30 in the case of YES in S12 while the printer 10 proceeds to S40 in the case of NO in S12. In another modification, S12 of FIG. 3 may be omitted. In this case, only the determination of S10 is executed, and the printer 10 proceeds to S30 in the case of YES in S10 while the printer 10 proceeds to S40 in the case of NO in S10. In general terms, a method to determine whether the communication device is in the proxy environment or in the non-proxy environment is not limited to the method described in the aforementioned embodiment.

(Modification 5) In S30 of FIG. 3, the printer 10 may not launch both the task 10A or task 10C to operate in the PM and the task 10B to operate in the EWM, but may launch only one task to operate in the PM and the EWM. In general terms, "receive a process executing notification" may be realized only by one task.

(Modification 6) The "communication device" may not be a printer, but may be a different device such as a scanner, a facsimile, a PC, or a server. When the scanner is an example of "communication device", a scan executing instruction sent from the terminal 50 to the server 100 is an example of "process executing instruction", and a scan process executed by the scanner is an example of "predetermined process". When the PC is an example of "communication device", a data sending instruction sent from the terminal 50 to the server 100 is an example of "process executing instruction", and a process for the PC to download data from the server 100 is an example of "predetermined process".

(Modification 7) In the above embodiments, the processes of FIGS. 2 to 13 are implemented by the CPU 32 of the printer 10 executing the program 36, however, at least one of these processes may be implemented by hardware such as a logic circuit.

What is claimed is:

1. A communication device comprising:
   a controller,
   wherein the controller is configured to:
   in a case where a process executing instruction is sent to a notification server from a terminal device, receive a process executing notification from the notification server; and
   in a case where the process executing notification is received from the notification server, execute a predetermined process,
   wherein the process executing notification is received by:
   operating in parallel in a first mode and a second mode;
   sending a polling signal to the notification server in the first mode;
   in a case where the polling signal is sent to the notification server after the process executing instruction has been sent to the notification server from the terminal device, receiving the process executing notification which is a response to the polling signal from the notification server;

establishing a connection of server-push type between the communication device and the notification server in the second mode; and in a case where the process executing instruction is sent to the notification server from the terminal device in a state where the connection is established, receiving the process executing notification from the notification server by using the connection.

2. The communication device as in claim 1, wherein in a case where a first condition is satisfied, the controller is configured to operate in parallel in the first mode and the second mode, and in a case where a second condition which is different from the first condition is satisfied, the controller is configured to operate only in one of the first mode and the second mode.

3. The communication device as in claim 2, wherein in a case where the communication device is in a proxy environment, the first condition is satisfied, in a case where the communication device is in a non-proxy environment, the second condition is satisfied, the proxy environment is an environment for executing communication with the notification server by using a proxy server, and the non-proxy environment is an environment for executing communication with the notification server without using the proxy server.

4. The communication device as in claim 3, wherein in a case where the second condition is satisfied, the controller is configured to operate only in the second mode among the first mode and the second mode.

5. The communication device as in claim 3, further comprising:

a memory, wherein in a case where proxy setting information for using the proxy server is stored in the memory, the controller is configured to determine the communication device is in the proxy environment, and in a case where the proxy setting information is not stored in the memory, the controller is configured to determine the communication device is in the non-proxy environment.

6. The communication device as in claim 3, wherein in a case where existence information indicating that the proxy server exists is received from a Dynamic Host Configuration Protocol (DHCP) server, the controller is configured to determine the communication device is in the proxy environment, and in a case where the existence information is not received from the DHCP server, the controller is configured to determine the communication device is in the non-proxy environment.

7. The communication device as in claim 2, wherein in a case where the communication device is in a proxy environment, the second condition is satisfied, in a case where the communication device is in a non-proxy environment, the first condition is satisfied, the proxy environment is an environment for executing communication with the notification server by using a proxy server, and the non-proxy environment is an environment for executing communication with the notification server without using the proxy server.

8. The communication device as in claim 7, wherein in a case where the second condition is satisfied, the controller is configured to operate only in the first mode among the first mode and the second mode.

9. The communication device as in claim 7, further comprising:

a memory, wherein in a case where proxy setting information for using the proxy server is stored in the memory, the controller is configured to determine the communication device is in the proxy environment, and in a case where the proxy setting information is not stored in the memory, the controller is configured to determine the communication device is in the non-proxy environment.

10. The communication device as in claim 7, wherein in a case where existence information indicating that the proxy server exists is received from a Dynamic Host Configuration Protocol (DHCP) server, the controller is configured to determine the communication device is in the proxy environment, and in a case where the existence information is not received from the DHCP server, the controller is configured to determine the communication device is in the non-proxy environment.

11. The communication device as in claim 2, wherein in a case where a predetermined signal is received from the notification server every time a predetermined period elapses without the process executing notification being received from the notification server in the second mode, the second condition is satisfied, in a case where the second condition is satisfied, the controller is configured to continuously operate only in the second mode among the first mode and the second mode, and in a case where the predetermined signal is not received from the notification server in spite of the predetermined period elapsing without the process executing notification being received from the notification server in the second mode, the first condition is satisfied.

12. The communication device as in claim 1, wherein the controller comprises:

a first task for operating in the first mode; and a second task for operating in the second mode, the second task being configured to be processed in parallel with the first task.

13. The communication device as in claim 12, further comprising:

a print execution unit, wherein the predetermined process includes a process for causing the print execution unit to print according to print data received from the notification server, and the first task includes receiving the print data from the notification server.

14. The communication device as in claim 12, further comprising:

a print execution unit, wherein the predetermined process includes a process for causing the print execution unit to print according to print data received from the notification server, and the second task includes receiving the print data from the notification server.

15. The communication device as in claim 12, wherein the first task includes:

monitoring the predetermined process being completed after the predetermined process starts; and in a case where the predetermined process is completed, executing a completion process in response to completion of the predetermined process.

16. The communication device as in claim 12, wherein the second task includes:

monitoring the predetermined process being completed after the predetermined process starts; and in a case where the predetermined process is completed, executing a completion process in response to completion of the predetermined process.

17. A non-transitory computer-readable recording medium storing computer-readable instructions for a communication device:

the computer-readable instructions, when executed by a processor of the communication device, cause the communication device to:

in a case where a process executing instruction is sent to a notification server from a terminal device, receive a process executing notification from the notification server; and in a case where the process executing notification is received from the notification server, execute a predetermined process, wherein the process executing notification is received by:

operating in parallel in a first mode and a second mode;

sending a polling signal to the notification server in the first mode;

in a case where the polling signal is sent to the notification server after the process executing instruction has been sent to the notification server from the terminal device, receiving the process executing notification which is a response to the polling signal from the notification server;

establishing a connection of server-push type between the communication device and the notification server in the second mode; and in a case where the process executing instruction is sent to the notification server from the terminal device in a state where the connection is established, receiving the process executing notification from the notification server by using the connection.

* * * * *